(No Model.) 7 Sheets—Sheet 2.

A. C. ALLYN.
PANORAMIC DISPLAY MECHANISM.

No. 557,179. Patented Mar. 31, 1896.

WITNESSES: INVENTOR:

(No Model.) 7 Sheets—Sheet 3.

A. C. ALLYN.
PANORAMIC DISPLAY MECHANISM.

No. 557,179. Patented Mar. 31, 1896.

WITNESSES: INVENTOR:

(No Model.) 7 Sheets—Sheet 4.

A. C. ALLYN.
PANORAMIC DISPLAY MECHANISM.

No. 557,179. Patented Mar. 31, 1896.

WITNESSES:
A. D. Harrison.
F. P. Davis.

INVENTOR:
A. C. Allyn
by Wright Brown & Quinby
Attys.

(No Model.) 7 Sheets—Sheet 6.
A. C. ALLYN.
PANORAMIC DISPLAY MECHANISM.

No. 557,179. Patented Mar. 31, 1896.

WITNESSES:
A. D. Harrison.
Rollin Abell.

INVENTOR:
A. C. Allyn
by Wright Brown & Quimby
Attys.

(No Model.) 7 Sheets—Sheet 7.
A. C. ALLYN.
PANORAMIC DISPLAY MECHANISM.

No. 557,179. Patented Mar. 31, 1896.

WITNESSES: INVENTOR:

UNITED STATES PATENT OFFICE.

ATHEAN C. ALLYN, OF BOSTON, MASSACHUSETTS.

PANORAMIC DISPLAY MECHANISM.

SPECIFICATION forming part of Letters Patent No. 557,179, dated March 31, 1896.

Application filed May 20, 1895. Serial No. 549,883. (No model.)

*To all whom it may concern:*

Be it known that I, ATHEAN C. ALLYN, of Boston, in the county of Suffolk and State of Massachusetts, have invented certain new and useful Improvements in Panoramic Display Mechanism, of which the following is a specification.

The object of the present invention is to provide an automatically-operating machine for successively displaying different portions of a flexible sheet or curtain having advertisements or other matter thereon. There are certain essentials to the successful attainment of the above-stated object, which may be enumerated as follows: The exposed stretch of the curtain must be held taut at all times. The curtain must be moved intermittently, so that the different advertisements or views shall each be seen a proper length of time while held still. There must be a positive connection between the curtain and its carriers, so as to insure each advertisement or view being fully exposed. There must be a reversing mechanism, so that when all the advertisements or views have been displayed by intermittent movement of the curtain in one direction the curtain will then be moved intermittently in the reverse direction. Moreover, there should be provision for adjustment to allow for curtains of different lengths.

All the essentials above enumerated are provided for by my invention, and in the accompanying drawings, which form part of this specification, I have illustrated a machine embodying the invention and particularly designed for location in some conspicuous place for the display of advertisements, although, of course, it might be used for other purposes, as for displaying views.

Of the said drawings, Fig. 8 shows intermittent gearing employed in the driving mechanism in side elevation and on an enlarged scale.

Figure 3:
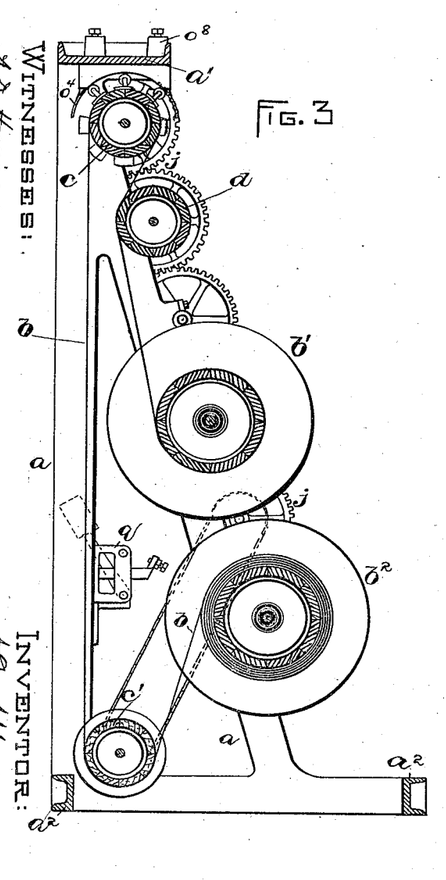
Fig. 3 shows a central vertical cross-section.
Figure 4:
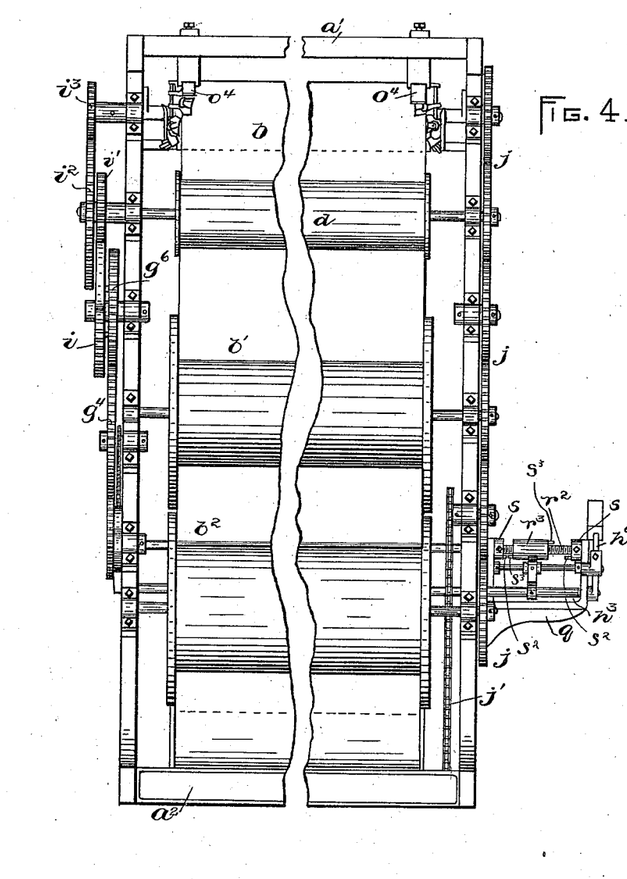
Fig. 4 shows a rear elevation, broken in the middle to economize space.

The supporting-frame of the machine comprises triangular uprights $a$, top cross-bar $a'$, and base $a^2$, and the frame is left open, so that a stretch of curtain can be displayed through the front of the same. The curtain is a sheet $b$, of any suitable material and construction possessing sufficient flexibility to roll up readily and sufficient stability to keep in shape, and the said sheet is attached at its ends to spring-rollers $b'$ and $b^2$ constructed, as shall presently be described, so as to hold the sheet taut. These spring-rollers are supported in bearings on the rear bars of the uprights $a$, and the curtain is carried around guide-rollers $c$ and $c'$ journaled in bearings at the top and bottom of the frame and in vertical alinement, so that they hold a stretch of the curtain in a vertical plane between the front bars of the uprights $a$. (See Fig. 3.) There is a roller $d$ in bearings on the rear bars of the uprights below the roller $c$ which guides the curtain under the latter, for a purpose which will hereinafter appear.

Figure 5:
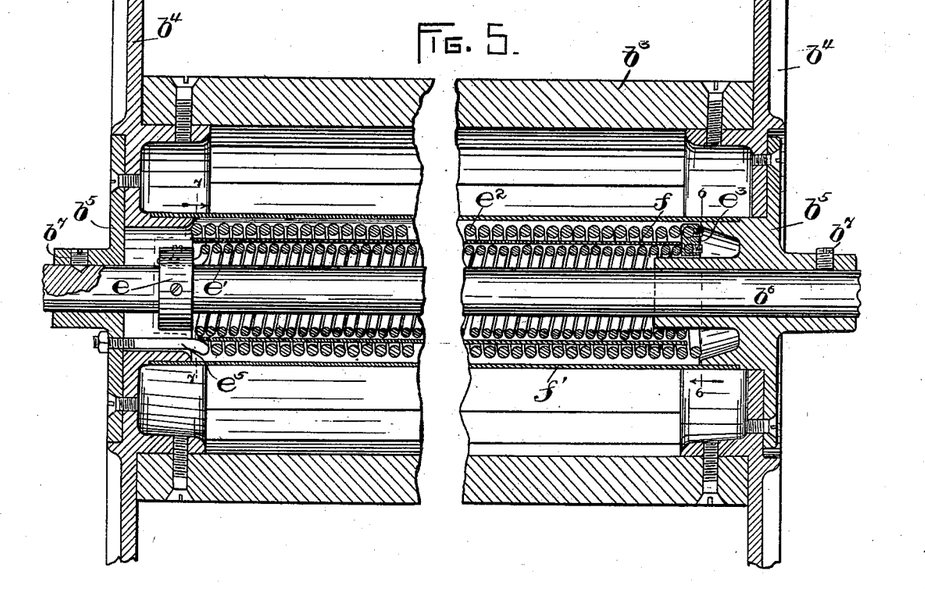
Fig. 5 shows a longitudinal section, on a greatly enlarged scale, of one of the spring-rollers on which the curtain is wound.
Figure 6:
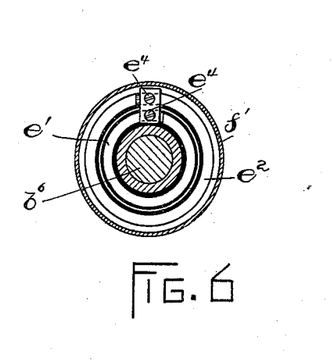
Figs. 6 and 7 show cross-sections taken on lines 6 6 and 7 7 of Fig. 5.

Each of the spring-rollers above referred to is of the following description, reference being had to Fig. 5: There is a cylindrical shell $b^3$, which is fastened to flanges of annuli $b^4$ having sufficient extent to form guards to confine the curtain laterally, and to said annuli there are fastened heads $b^5$, which are rotatable on a shaft $b^6$ constituting the journal of the roller, and may be affixed thereto by set-screws $b^7$, for a purpose hereinafter explained. A collar $e$ affixed to the said shaft near one end of the roller receives one end of a spiral spring $e'$, which is fastened therein, and the said spiral spring surrounds the shaft throughout the greater portion of its extent within the roller. A second spiral spring $e^2$ surrounds the spring $e'$ and is rigidly connected therewith at its free end by means of a block $e^3$, which receives the ends of the springs, as shown in Fig. 6, and in which they are secured by set-screws $e^4$. At the opposite end the outer spring $e^2$ is formed into an arm $e^5$, which is screw-threaded and passed through the head $b^5$, a nut being turned onto its end.

The coils of the two springs extend reversely, and it will be seen that both springs act as one. The inside spring being of smaller diameter is made of smaller wire than the outer one, so as to equalize the tensile action of each and insure their acting together as a single spring. By this arrangement of the springs I am enabled to obtain as great a retractile force from them as desired, within the limited interior of the roller.

In order to keep the springs in place and prevent entanglement of them, I employ tubes $f$ and $f'$, of thin metal, one being interposed between the two springs and the other inclosing the outer spring.

The two spring-rollers are reversed end for end, so that their springs act oppositely, and before the curtain is attached the rollers are turned on their shafts so as to put the springs under tension and are then affixed to the shafts by the set-screws $b^7$. This prevents movement of the rollers while the curtain is being attached. The curtain having been attached to one roller, it is rolled up on the same and passed around the guide-rollers and its end attached to the other roller. After this has been done the set-screws of the two rollers are released, and the springs immediately exert themselves to stretch the curtain taut, and they constantly act to take up slack in the curtain caused by the changing diameters of the rolls as the curtain unrolls from one roller and is rolled up on the other.

By the arrangement of springs shown a great length of curtain can be kept under tension, so as to be always taut in its exposed stretch. All the rollers which engage the curtain are positively driven, the connections being of the following description: The letter $g$ designates the driving-shaft, which may be connected with any suitable source of power and carries a driving-pinion $g'$ in mesh with gears $g^2$ and $g^3$ loose on studs of a rocking plate $h$ pivoted concentrically with the driving-shaft. The gear $g^2$ is designed to mesh directly into a larger gear $g^4$, whereas the gear $g^3$ is designed to connect therewith through an intermediate $g^5$, also on the rocker-plate. The latter forms part of a reversing mechanism, which will be described hereinafter.

The gear $g^4$ is supported by a bearing on the frame and meshes into a gear $g^6$ loose on a stud $g^7$ supported by the frame, and said stud also has loosely mounted upon it a mutilated gear $i$, which is impelled by the gear $g^6$ through yielding connections, presently to be described, and which constitutes one member of what is commonly known as a "Geneva gearing" for producing intermittent motion. The other member of the same is designated by the letter $i'$, and it is fixed on the same sleeve or hub as a gear $i^2$, which is in mesh with a gear $i^3$ on the journal of the guide-roller $c$. A train of gearing $j$ at the opposite side of the machine transmits motion to the rollers $d$, $b'$, and $b^2$, and motion is transmitted to the roller $c'$ by a sprocket-chain $j'$ engaging sprocket-wheels on the journals of the said roller and one of the gears $j$. The hub of the gears $i'$ and $i^2$ is loose on the journal $d^4$ of the roller $d$.

It will be seen that through the connections described the rollers will be intermittently driven.

Figure 7:
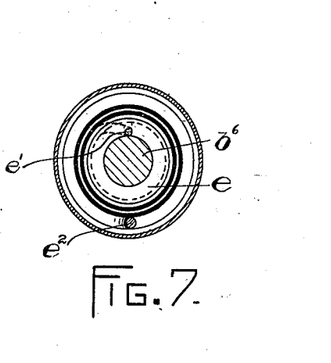
Figures 7, 9:
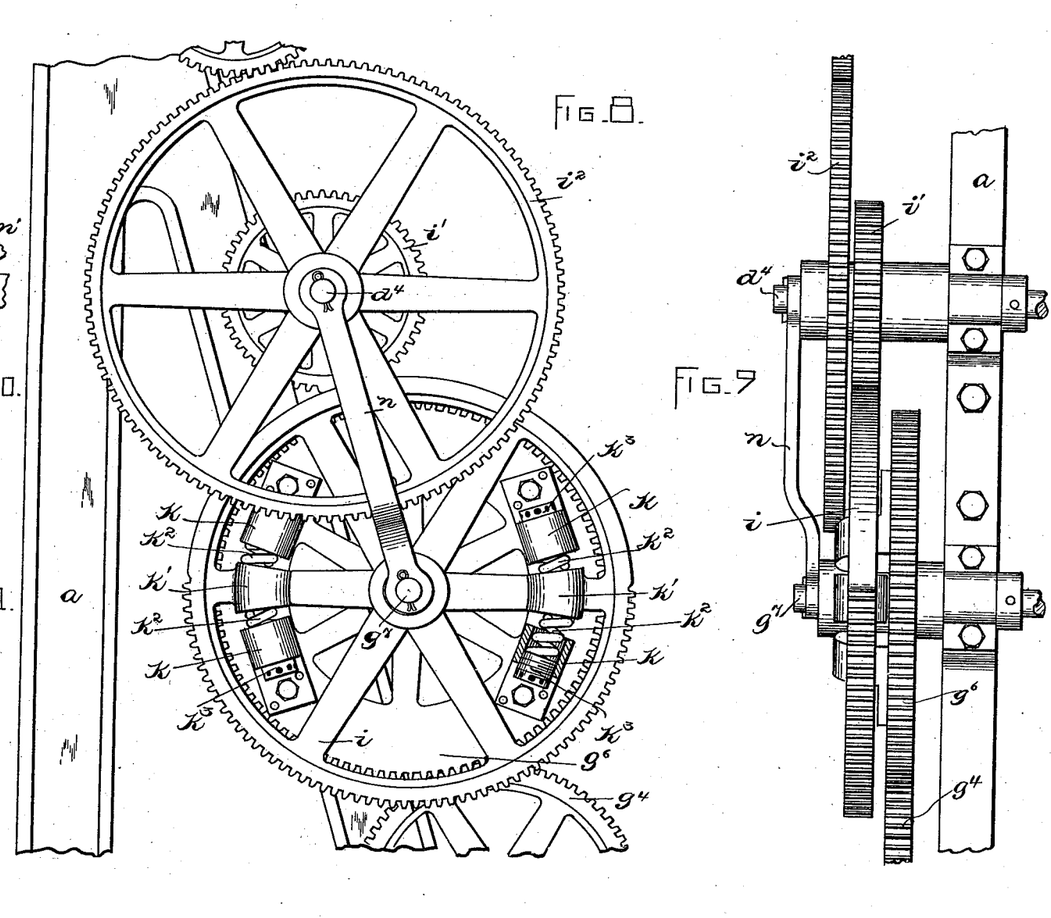
Fig. 9 shows an edge view of the same.

The yielding connection between the gears $g^6$ and $i$ is for the purpose of cushioning the impact of the teeth of the mutilated gears to prevent breaking of the same. Two forms of connection are here shown. (See Figs. 8 to 11.) In the form shown in Figs. 8 and 9 the gear $g^6$ has fastened to it two sets of tubular sockets $k$, which project on opposite sides of spokes of the gear $i$, the said spokes being enlarged, as shown at $k'$, between the sockets. Spiral springs $k^2$ occupy the sockets and bear against the spokes and against screw-plugs $k^3$ in the sockets, so that by turning the said plugs the tension of the springs can be regulated.

Figure 10:
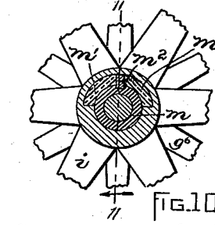
Figs. 10 and 11 show sectional views of a modification in the intermittent gearing, one view being a cross-section and the other view a longitudinal section.
Figure 11:
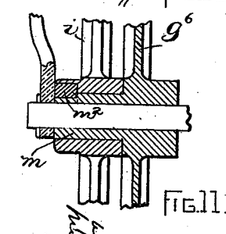

In the form of connection shown in Figs. 10 and 11 the driving-gear $g^6$ has a hub $m$, which extends within the hub of the driven gear, and the latter is recessed to receive rubber blocks $m'$, which bear against opposite sides of a projection $m^2$ on the hub $m$. Moreover, the points of cushioning impact are substantially in diametrical alinement with the end teeth of the acting section of the mutilated driving-gear, and thus as direct a cushioning effect as possible is obtained.

With either form of connection it will be seen that the gear $i$ is permitted to yield when its teeth come against those of the gear $i'$.

In order to maintain even engagement of the smooth portions of the gears $i$ and $i'$, I employ a tie-bar $n$, which fits over the stud $g^7$ and the shaft $d^4$ and prevents movement thereof toward or from each other. Without this bar or its equivalent the projecting stud and shaft would be likely to bend under the strain put upon them.

In connection with the upper guide-roller $c$ I employ gripping devices to establish a positive engagement between the curtain and the roller, so as to prevent slipping of the curtain and insure the full exposure of each advertisement. There is a set of grippers $o$ at each end of the roller, (see Figs. 14 and 15,) and they are pivoted at the perimeter of the roller. These grippers are movable to bear against the curtain where it lies upon the roller or to stand clear of the curtain where it extends away from the roller.

Figure 14:
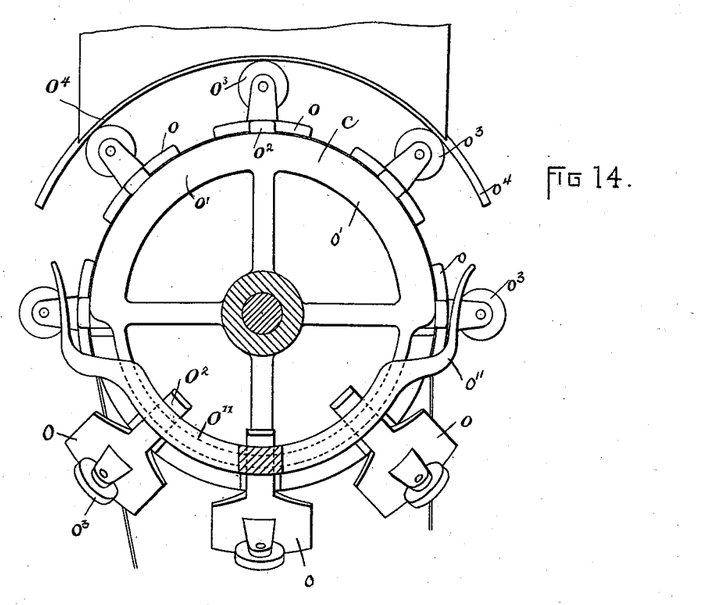
Fig. 14 shows an end view, on an enlarged scale, of a certain curtain carrying and guiding roller with appurtenances for establishing positive connection between it and the curtain.
Figure 15:
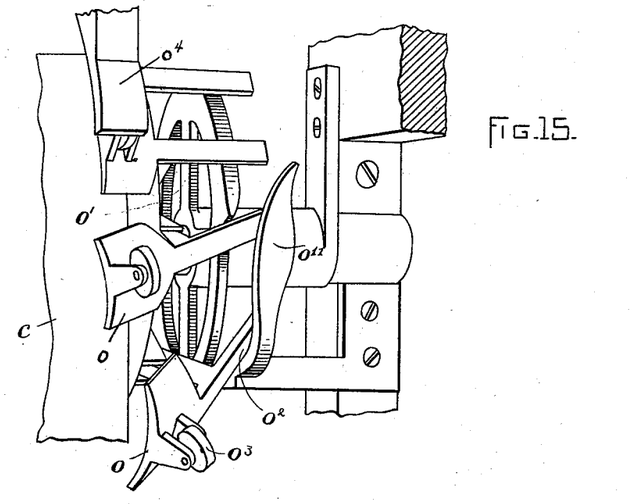
Fig. 15 shows a perspective view of the devices seen in Fig. 14.

On the outer side of the grippers there are formed bearings for antifriction-rollers $o^3$, and extending over the roller there is a cam-strip $o^4$, with which said rollers come into engagement to press the grippers upon the curtain. The grippers are governed in their movements by cams $o'$ and $o''$, which by engagement with the heels $o^2$ of the grippers move them in and out, so that they alternately grip and release the curtain. As the roller rotates the grippers are moved in over the curtain and caused to press the same against the roller, so that it cannot slip, and there will always be three of the grippers in action and a positive engagement of the curtain with the roller. By carrying the curtain in under the roller $c$ by means of the roller $d$ any engagement of the grippers with the edge of the curtain as they move out is obviated.

Figures 12, 13, 18, 19:
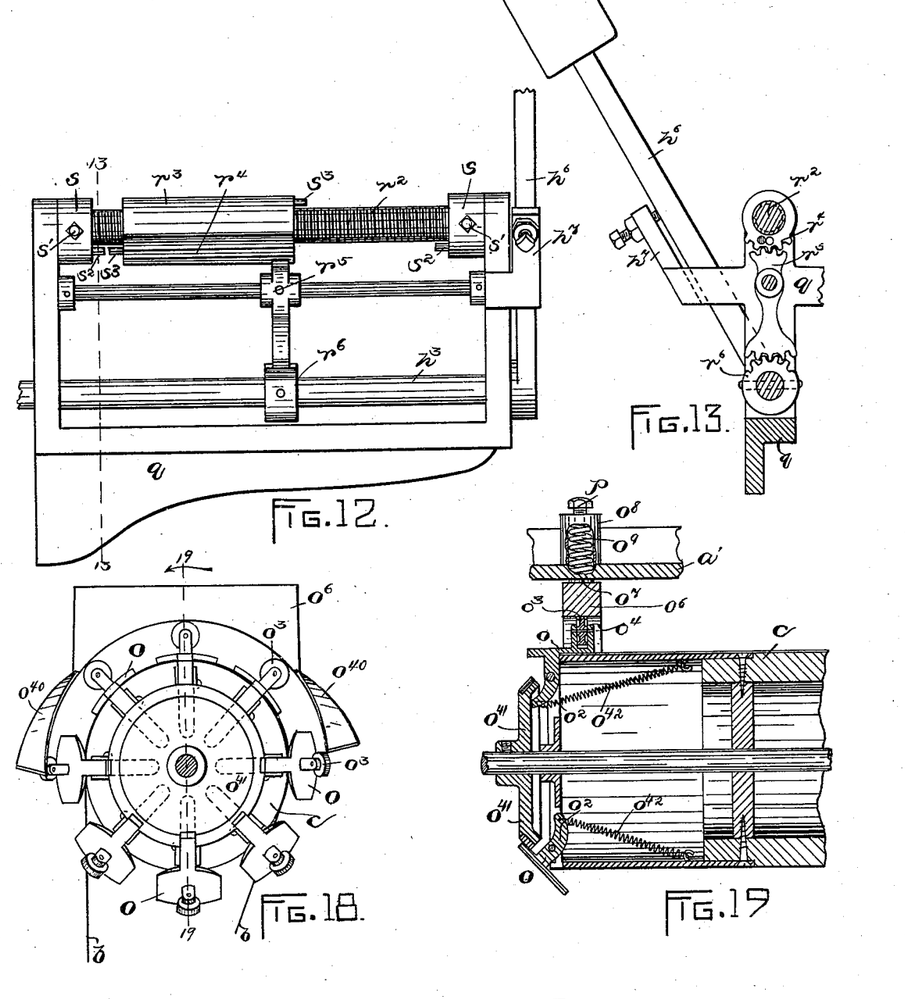
Fig. 12 shows a rear elevation of reversing mechanism on an enlarged scale.
Fig. 13 shows a section on line 13 13 of Fig. 12.
Fig. 18 shows a view similar to Fig 14, illustrative of a modification.
Fig. 19 shows a section on line 19 19 of Fig. 18.

The cam-strip may be yieldingly sustained, so as to give some relief in the pressure of the grippers on the roller and to compensate for variations in the thickness of the curtain or material passing over the rollers, the construction for accomplishing this being best shown in Fig. 19. The strip is here shown fastened to a block $o^6$, which has pins $o^7$ projecting up into sockets $o^8$ on the top cross-bar $a'$ of the frame and being surrounded by spiral springs $o^9$, which bear at one end on shoulders of the pins and at the other against the tops of the sockets. The heads of screws $p$, entered through the tops of the sockets and into the pins, limit the action of the springs. Figs. 18 and 19 illustrate a modified construction in which the outward movement of the grippers is produced by spiral springs $o^{42}$, which are connected with the heels of the grippers and with the roller on the interior thereof. The top cam-strip is formed with laterally-extending end portions $o^{40}$ to engage the rollers on the grippers and move the latter inward. A disk $o^{41}$ fastened to the journal of the roller limits the action of the springs.

Figures 1, 2, 16, 17:
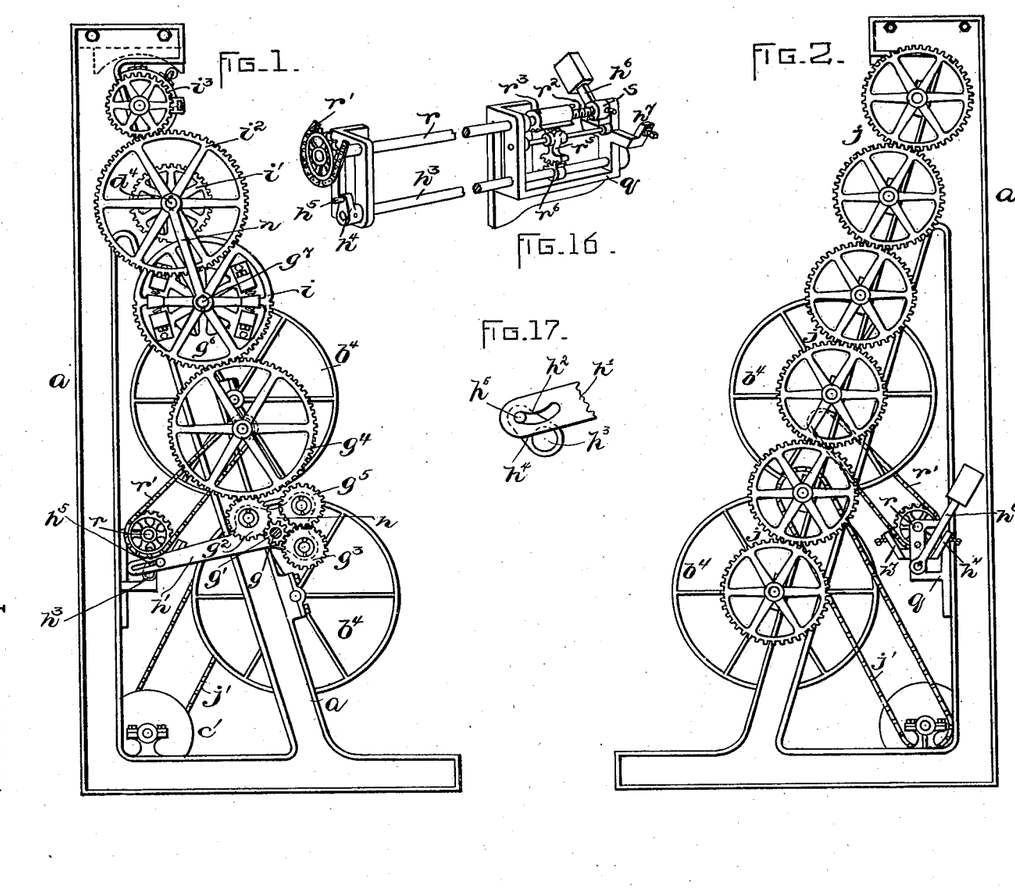
Figure 1 shows one side of the machine in elevation.
Fig. 2 shows the other side.
Fig. 16 shows the reversing mechanism in perspective, looking from the rear.
Fig. 17 shows a detail of part of the reversing mechanism.

When the curtain has been unrolled from one spring-roller onto the other, the driving mechanism must be reversed, and this I accomplish through the following-described means:

The rocker-plate $h$ hereinbefore mentioned is movable about its center to throw either one of the gears $g^2$ or $g^5$ into mesh with the gear $g^4$, while the other is thrown out of mesh. This rocker-plate has an arm $h'$, which near its end is provided with an arc-shaped slot $h^2$. (See Fig. 17.)

A rock-shaft $h^3$, which extends across the machine, carries a crank $h^4$ having a pin $h^5$, which engages the said slot $h^2$, so that by movement of said shaft the arm can be shifted, the pin taking up position in one end or the other of the slot and locking the arm against any accidental movement. The rock-shaft extends through a bracket $q$ fastened to the machine-frame, and carries at its end beyond said bracket a weighted arm $h^6$, which both limits the shaft's movement by abutting the stops $h^7$ and holds the shaft from accidental turning. Another shaft $r$, which extends across the machine and through the bracket $q$ parallel with the shaft $h^3$, is connected by a sprocket-chain $r'$ with the gear $g^4$ so as to be continuously driven while the machine is in operation. This shaft $r$ is screw-threaded, as at $r^2$, where it extends between the sides of the bracket $q$, and there is an elongated sleeve $r^3$ mounted upon it and internally threaded for engagement with it. The sleeve $r^3$ is formed with a segement of gear-teeth $r^4$, which extend throughout its length, and there is a double-ended segment $r^5$, which is pivoted centrally between the sides of the bracket and is in mesh with the teeth $r^4$ at one end and with a segment $r^6$ on the shaft $h^3$ at the other end.

On the screw-shaft $r$ there are affixed collars $s$ by means of set-screws $s'$, and these collars have pins $s^2$ projecting toward the sleeve $r^3$. The latter has pins $s^3$ projecting from its ends and adapted to coact with the pins $s^2$.

The operation of the reversing mechanism is as follows: Supposing the curtain to be entirely unrolled from one of the spring-rollers onto the other and the machine to have started to roll it up on the empty roller, the sleeve $r^3$ is at one end of the screw-threaded portion of the shaft $r$ and the continued turning of the shaft moves it toward the other end of the screw-threads without, however, turning the sleeve. When the curtain has all been unrolled, the movement of the sleeve carries its pin into the path of that on the collar of the screw-shaft, and then the latter pin, acting against that of the sleeve, turns the sleeve and the motion is transmitted to the rock-shaft $h^3$ by the segment $r^5$. The turning of the rock-shaft shifts the rocker $h$, as heretofore explained, and reverses the gearing. By adjusting the collars $s$ longitudinally of the screw-shaft the reversing mechanism can be accommodated to different lengths of curtains on the rollers.

Figures 20, 21, 22:
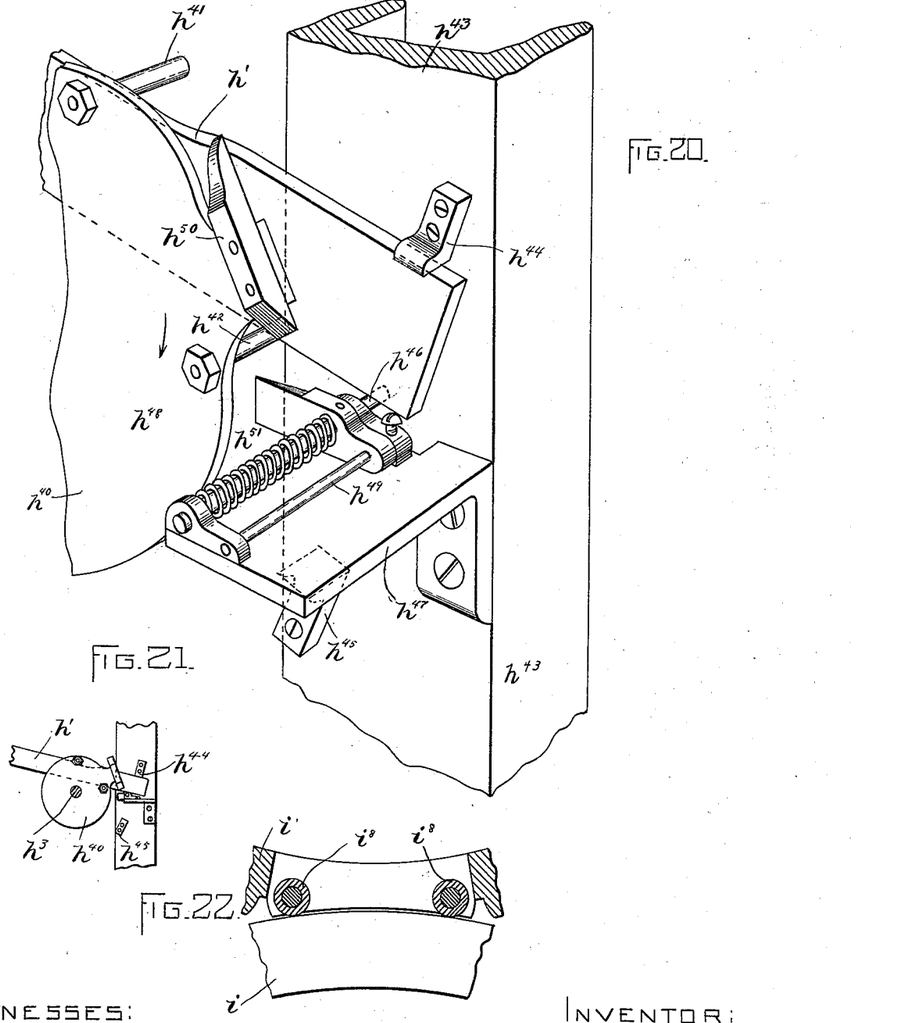
Fig. 20 is a perspective view showing means for locking the rocker-arm in its different positions.
Fig. 21 represents a side view, on a smaller scale, of the mechanism shown in Fig. 20.
Fig. 22 represents a view showing parts of the Geneva gearing.

In Figs. 20 and 21 I show means differing from those hereinbefore described for oscillating the arm $h'$ and rocker-plate $h$. Instead of the crank $h^4$ and its pin $h^5$ engaging a slot in said arm I show in said figures a disk $h^{40}$ affixed to the shaft $h^3$ and provided with two studs $h^{41}$ $h^{42}$ located, respectively, above and below the arm $h'$ and a fixed support $h^{43}$ provided with stops $h^{44}$ $h^{45}$, which limit the movements of the arm $h'$ and a locking device adapted to lock the arm against either stop.

Said locking device is a bolt $h^{46}$ movable in guides on a fixed bracket $h^{47}$ and provided with a beveled arm $h^{48}$, which slides with the bolt and is guided by a fixed rod $h^{49}$. The disk $h^{40}$ has an arm $h^{50}$ provided with beveled ends and arranged to press the arm $h^{48}$ backward against the force of a spring $h^{51}$. When the disk $h^{40}$ is in the position shown in Fig. 20, the arm $h'$ is locked between the stop $h^{44}$ and the bolt $h^{46}$. When the disk $h^{40}$ is turned by the shaft $h^3$ in the direction indicated by the arrow in Fig. 21, the arm $h^{50}$ acts on the arm $h^{48}$ and retracts the bolt before the stud $h^{41}$ acts on the arm $h'$ and holds the bolt retracted until the arm $h'$ is below the bolt. The bolt is then released and is projected over the arm $h'$, the latter being thus locked between the bolt and the stop $h^{45}$. The arm is therefore locked in both positions, and accidental separation of the gears $g^2$ or $g^5$ from the gear $g^4$ is thus prevented.

In Fig. 22 I show the smooth portion of the member $i'$ of the Geneva gearing provided with antifriction-rolls $i^8$ $i^8$, which are arranged to run upon the smooth portion of the member $i$ and prevent bending and friction when said portions come together.

What I claim as my invention is as follows:

1. In a panoramic display-machine, a curtain-roller comprising a shaft, a cylinder mounted to turn thereon, a spiral spring surrounding the shaft and fastened at one end thereto, another spiral spring surrounding the first-named spring and fastened at one end to the cylinder, a fastening rigidly connecting the other ends of the two springs, a separating-tube interposed between the two springs, and a tube inclosing the outer spring.

2. In a panoramic display-machine, the combination of a roller, a curtain on the same, roller-equipped grippers pivoted to the roller and adapted to take over the curtain thereon, and a cam-strip partially encircling the curtain-roller for coaction with the rollers on the grippers in pressing the latter against the curtain.

3. In a panoramic display-machine, the combination of a roller, a curtain on the same, roller-equipped grippers pivoted to the roller and adapted to take over the curtain thereon, and a cam-strip partially encircling the curtain-roller for coaction with the rollers on the grippers in pressing the latter against the curtain, said cam-strip being yieldingly sustained, substantially as and for the purpose described.

4. In a panoramic display-machine, a reversing mechanism for gearing, the same comprising a rocker supporting two gears adapted to mesh with the driven gear under different adjustments of the rocker and each in connection with a driving-pinion, the one through an intermediate and the other directly, a screw in connection with the driven gear and having abutments at opposite ends, a traveler on said screws having abutments for coaction with those of the screw, and suitable connections between the said traveler and the gear-carrying rocker, whereby turning of the traveler shifts the rocker, substantially as described.

5. In a panoramic display-machine, a reversing mechanism for gearing, the same comprising a rocker supporting two gears adapted to mesh with the driven gear under different adjustments of the rocker and each in connection with a driving-pinion, the one through an intermediate and the other directly, a screw in connection with the driven gear and having abutments at opposite ends, a traveler on said screw having abutments for coaction with those of the screw, a double segment in gear with the traveler, and a rock-shaft in gear with the segment and having a crank which engages the gear-carrying rocker.

6. In a panoramic display-machine, a reversing mechanism for gearing, the same comprising a rocker supporting two gears adapted to mesh with the driven gear under different adjustments of the rocker and each in connection with a driving-pinion, the one through an intermediate and the other directly, a screw in connection with the driven gear and having abutments at opposite ends, a traveler on said screw having abutments for coaction with those of the screw, a double segment in gear with the traveler, and a rock-shaft in gear with the segment and having a crank which engages the gear-carrying rocker, and a weighted arm.

7. In a panoramic display-machine, the combination of a rocker supporting two gears adapted to mesh with a driven gear under different adjustments of the rocker and each in connection with a driving-pinion, the one directly and the other through an intermediate, means connected with the driven gear for periodically tilting the rocker, a lock engaging said rocker, and a lock-releasing device compounded with the said tilting means, substantially as described.

8. In a panoramic display-machine, the combination of a reversing rocker, means for tilting the same, a spring-pressed bolt for locking the rocker, and a bolt-retracting cam compounded with the tilting means substantially as described.

In testimony whereof I have signed my name to this specification, in the presence of two subscribing witnesses, this 18th day of May, A. D. 1895.

ATHEAN C. ALLYN.

Witnesses:
  C. F. BROWN,
  A. D. HARRISON.